US006590577B1

(12) United States Patent
Yonts

(10) Patent No.: US 6,590,577 B1
(45) **Date of Patent: *Jul. 8, 2003**

(54) SYSTEM AND METHOD FOR CONTROLLING A DYNAMIC DISPLAY OF DATA RELATIONSHIPS BETWEEN STATIC CHARTS

(75) Inventor: Richard Yonts, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/323,164

(22) Filed: May 27, 1999

(51) Int. Cl.[7] ................................................ G06T 11/20

(52) U.S. Cl. ................. 345/440; 345/440.1; 345/440.2; 345/473; 345/629; 345/736

(58) Field of Search ................................ 345/440, 441, 345/112, 113, 121, 133, 140, 520, 522, 523, 4, 5, 10, 11, 30, 35, 473, 474, 619, 629, 630, 632, 636, 475, 440.1, 440.2

(56) References Cited

U.S. PATENT DOCUMENTS 4,877,404 A 10/1989 Warren et al.
5,339,392 A 8/1994 Risberg et al. ............. 395/161
5,371,842 A * 12/1994 Easton ....................... 395/140
5,375,201 A 12/1994 Davoust ..................... 395/161
5,461,570 A * 10/1995 Wang ......................... 364/468
5,483,468 A * 1/1996 Chen ..................... 364/551.01
5,510,809 A * 4/1996 Sakai ......................... 345/133
5,513,306 A 4/1996 Mills et al.
5,515,490 A 5/1996 Buchanan et al.
5,581,677 A 12/1996 Myers et al. ............... 395/140
5,581,678 A 12/1996 Kahn ......................... 395/140
5,619,631 A 4/1997 Schott
5,684,945 A * 11/1997 Chen ..................... 395/182.18
5,721,815 A 2/1998 Ottesen et al.
5,721,878 A 2/1998 Ottesen et al. .............. 395/500
5,739,823 A * 4/1998 Akaza ........................ 345/440
5,751,883 A 5/1998 Ottesen et al.
5,844,572 A * 12/1998 Schott ........................ 345/440
5,880,742 A 3/1999 Rao et al. ................... 345/440
5,883,635 A 3/1999 Rao et al. ................... 345/440
5,999,162 A * 12/1999 Takahashi ................... 345/121
6,097,399 A * 8/2000 Bhatt ......................... 345/440
6,417,855 B1 * 7/2002 Yonts ......................... 345/440

FOREIGN PATENT DOCUMENTS

JP 03132790 6/1991 ............ G09G/5/00
JP 06096228 4/1994 ........... G06F/15/72
JP 06131470 5/1994 ........... G06F/15/72
JP 09204535 8/1997 ........... G06T/11/20
JP 2001043296 2/2001 ........... G06F/19/00

OTHER PUBLICATIONS

"MacUser—The Mac's premier business–charting program . . . " http://www.deltapoint.com/dgpro/dg10003.htm.
"SpaceCharts—Java–based 3–Dimensional Charting Package," http://www.infospace–inc.com/docs/webchart/data cht.htm.

(List continued on next page.)

*Primary Examiner*—Matthew C. Bella
*Assistant Examiner*—Wesner Sajous
(74) *Attorney, Agent, or Firm*—Sawyer Law Group LLP

(57) ABSTRACT

Method and system aspects for controlling a dynamic display of static chart data are described. The aspects include obtaining data from first and second static charts, displaying data from the first static chart as a beginning chart, and adjusting the displayed data from the first static chart to visually indicate a change in the data required by the data from the second static chart as an ending chart in a direction and with a delay based on a selected display control event. Display control events include play forward, play reverse, fast forward, fast reverse, slow forward, slow reverse, and stop.

21 Claims, 4 Drawing Sheets

OTHER PUBLICATIONS

"DV–Xpresso,""WebXpresso," "DV–Centro Builds Visual Languages," http://www.datviews.co.uk/html/products.htm.

"What Is WebXpresso?" http://www.dvcorp.com/webxpresso/whatis.htm.

"ImageStream Graphics and Presentation Filters 1996 Format Listing," http://www.inso.com/isformat.htm.

"Macintosh software provides wide range of formats for business, scientific, statistical data," http://deltapoint.com/dgpro/dg10001.htm.

"ImageStream Graphics and Presentation Filters," http://www.inso.com/imstream.htm.

* cited by examiner

SYSTEM AND METHOD FOR CONTROLLING A DYNAMIC DISPLAY OF DATA RELATIONSHIPS BETWEEN STATIC CHARTS

RELATED APPLICATIONS

The present application is related to co-pending U.S. patent application Ser. No. 09/123,716, entitled SYSTEM AND METHOD FOR DYNAMICALLY DISPLAYING DATA RELATIONSHIPS BETWEEN STATIC CHARTS, and assigned to the assignee of the present invention.

FIELD OF THE INVENTION

The present invention relates to dynamic presentations of static chart displays, and more particularly, to controlling dynamic presentations of static chart displays.

BACKGROUND OF THE INVENTION

The abundance of information generated in today's computer world is ever-increasing. Databases and spreadsheet programs assist in storing and entering data in a variety of categories. Data analysis typically utilizes some form of graphical displays of stored data. Most graphical displays represent either discrete time intervals, or a summary of chosen data from multiple time intervals.

Charts of discrete time intervals are, by nature, mere snapshots of data. These chart displays of historical data are thus difficult to view and understand in order to see trends in the data. Further, a series of related charts that display similar data but vary by some criterion, e.g., days, are tedious to view, especially when there are large numbers of charts. When related charts are displayed together, e.g., across a desktop display of a computer system, identifying the correlation among the charts is difficult, and even when viewed separately but consecutively, such as in a slide show, the display is normally choppy and difficult to control. Thus, viewers are required to remember information from each static chart/display over a large number of charts. Such requirements result in a less intuitive method of display. Summary displays are somewhat more intuitive than individual static displays. However, as summary charts, they do not usually provide the level of detail that individual static charts provide.

A need exists for controlling how the chart data is viewed for assisting in interpreting trends during chart analysis. The present invention addresses such a need.

SUMMARY OF THE INVENTION

The present invention provides method and system aspects for controlling a dynamic display of static chart data. The aspects include obtaining data from first and second static charts, displaying data from the first static chart as a beginning chart, and adjusting the displayed data from the first static chart to visually indicate a change in the data required by the data from the second static chart as an ending chart in a direction and with a delay based on a selected display control event. Display control events include play forward, play reverse, fast forward, fast reverse, slow forward, slow reverse, and stop.

The present invention provides a beneficial, meaningful way to adjust the display of data variations among related, static charts to achieve more flexibility during displayed data transitioning. Through progressive displaying of intermediate charts, the impression of continuity and an intuitive understanding of chart relationships are given. Discrete steps in data collection are visualized in a chosen direction and with a chosen delay between displays to increase user control over the display. These and other advantages of the aspects of the present invention will be more fully understood in conjunction with the following detailed description and accompanying drawings.

DETAILED DESCRIPTION OF THE INVENTION

The present invention relates to controlling the dynamic presentation of data relationships between static charts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
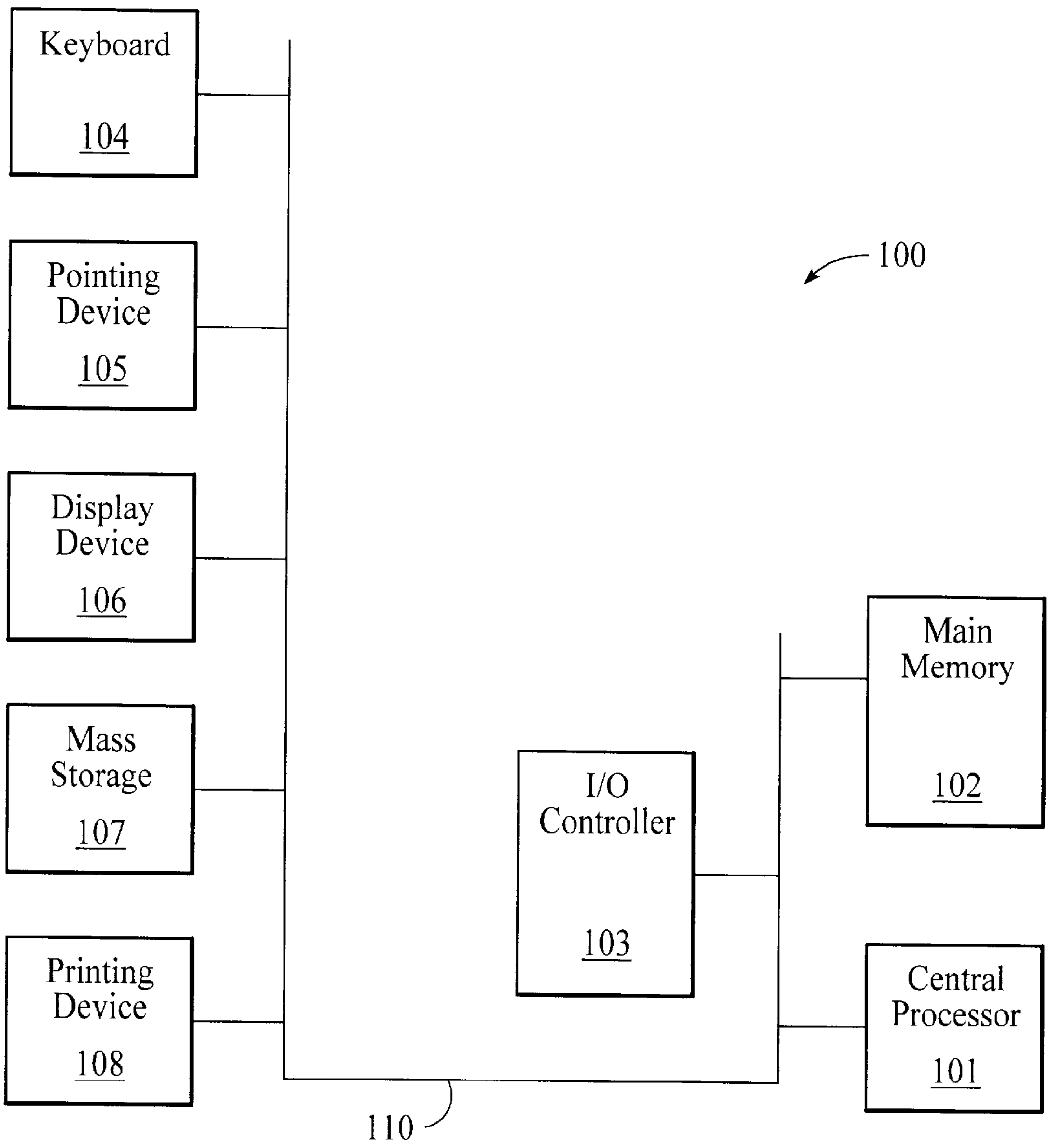
FIG. 1 illustrates a computer system suitable for embodying the present invention.

The present invention is suitably embodied in a computer system such as system 100 shown in FIG. 1 which includes: a central processor 101; a main memory 102; an input/output controller 103; a keyboard 104; a pointing device 105 (e.g., a mouse, trackball, pen device, or the like); a display device 106; and a mass storage device 107 (e.g., a hard disk). Additional input/output devices, such as a printing device 108, may be included in the system 100 as desired. As shown, the various components of system 100 communicate through a system bus 110 or similar architecture. The system 100 suitably represents an IBM-compatible personal computer system, available from a variety of vendors, including IBM Corporation, Armonk, N.Y. System 100 operates in accordance with an operating system and one or more application programs, as is well understood by those skilled in the art.

Figure 2:
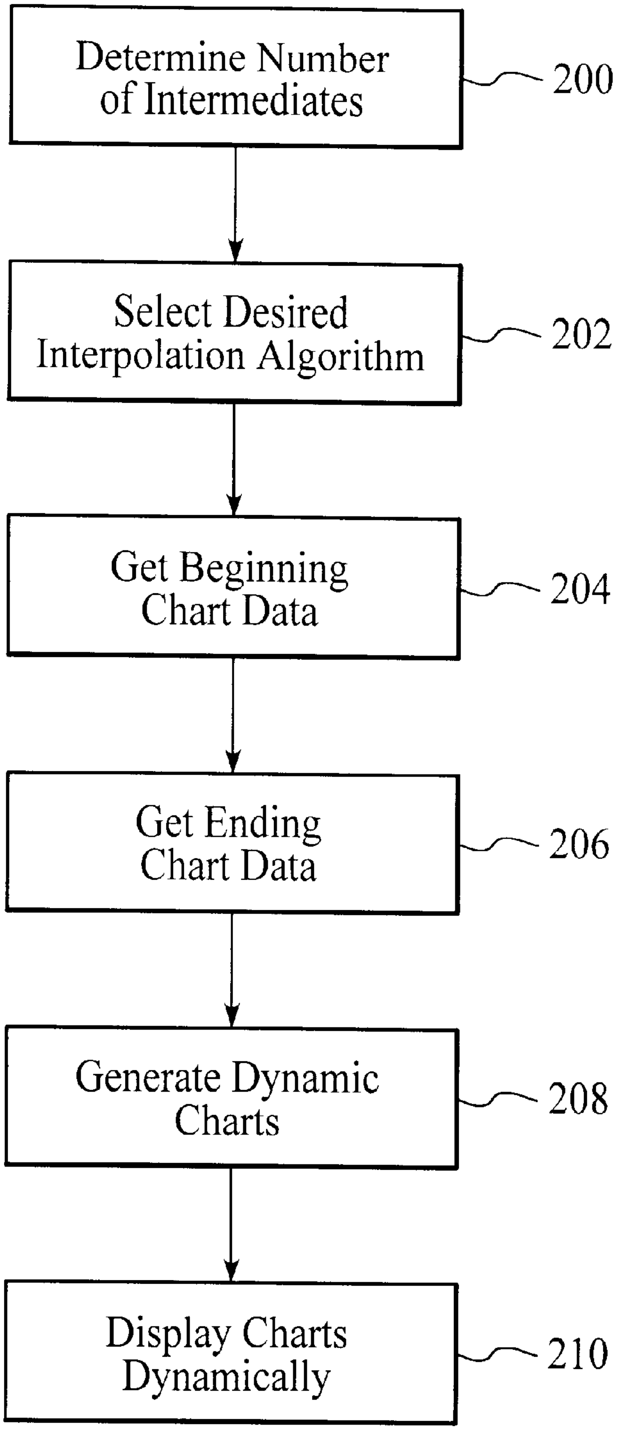
FIG. 2 illustrates a flow diagram of a process for generating dynamic charts.

In the present invention, generation of dynamic charts from static data charts provides more intuitive presentation of trends exhibited by the static charts. A flow diagram of a preferred process of generating dynamic charts via a suitable programming routine from a computer readable medium is described with reference to FIG. 2, while FIGS. 3*a*, 3*b*, 3*c*, 3*d*, and 3*e* illustrate an example of successive charts that would provide a dynamic transition from an initial static chart (FIG. 3*a*) to an ending static chart (FIG. 3*e*). It should be appreciated that FIG. 2 illustrates one embodiment of a sequence of steps. This is meant to be illustrative of a preferred embodiment. Other sequences may be utilized to achieve the dynamic chart presentation in accordance with the present invention in which data is obtained from static charts with the display of the data from a first chart adjusted to visually indicate a change in the data required by a second chart, as described in more detail hereinbelow.

With reference to FIG. 2, a general algorithm initiates with a determination of a number of intermediate points that are to be used in generating the dynamic charts (step 200). For example, thirty points has been found to work well by the inventors, but the number chosen is design dependent, e.g., dependent upon the desired smoothness of transition, as well as the processing capabilities of a given system. For the example shown in FIGS. 3*a*–3*e*, the number of intermediate points is four. The process then continues with a selection of a desired interpolation algorithm for interpolating ,between points (step 202), for example, a linear interpolation algorithm. Preferably, the actual method of interpolation is selectable, either by multi-selection logic or using object-oriented technology, as is well understood by those skilled in the art. It should be appreciated, however, that while the selection of a desired algorithm allows greater flexibility in customizing how transitions occur between the intermediate points, the desired manner of performing the transition between points can be programmed directly, thus making the selection step unnecessary in such processes.

Once the number of points and interpolation algorithm are chosen, the data stored in memory, e.g., from a spreadsheet program, database, or the like in storage 107, is retrieved for the beginning static chart (step 204) and the ending static chart (step 206). Suitably, the charts have similar data in a consistent display (e.g., similar axes, scales, titles, footnotes, etc.). Based on the interpolation algorithm and number of points between the beginning and ending static charts, the intermediate charts are generated (step 208). The dynamic display then occurs (step 210) by displaying the intermediate charts successively from the beginning chart through to the ending chart. Thus, the beginning chart is displayed and overlaid by an initial intermediate chart at a specified interval avoiding flicker/visual distraction, with the overlay repeated for each next intermediate chart until the ending static chart is displayed. For a group of static charts that has more than two static charts, e.g., monthly static charts from an initial static chart of January through a final static chart of December, the ending chart of each set of two charts suitably becomes the beginning chart for a next set of two charts, and the process is repeated until all the static charts in the group have been displayed.

To make the display smooth, preferably the well-known graphics techniques of tweening and morphing are employed, where tweening suitably refers to a technique where intermediate views are created by algorithmic interpolation of points, objects pictures, etc., between a starting display and an ending display. Usually, the view is mathematically the half point between the two displays. Tweens represent static views between other static views. Morphing suitably refers to a technique where one view is gradually changed from the initial view into the target view by some technique. Usually, morphing applies to graphics (pictures) and is a dynamic process. Morphing may use tweening to determine its intermediate states but is not limited to such a technique.

In general, pseudo-code for the process of steps 204, 206, 208, and 210 illustrated in FIG. 2 is described by:

```
FOR count=1 TO number_charts−1
  generate n intermediate_charts between chart[count] and
    chart[count+1]
  display static chart[count]
  FOR index=1 TO intermediate_steps
    wait specified interval
    display intermediate_chart[index]
  END
END
wait specified time interval
display static chart[number_charts]
```

In generating the intermediate charts, the chart data is suitably represented as a matrix, e.g., a two-dimensional matrix. The following describes generation of intermediate charts in terms of pseudo-code for a two-dimensional matrix.

```
BEGIN
  FOR i=1 TO shape_dimension 1
    FOR j=1 TO shape dimension 2
      intermediate_chart[i, j]=Interpolate_data(first_
        chart[i, j],
        last_chart[i, j],
        index)
    END
  END
  return intermediate_chart
END
```

Pseudo-code for the Interpolate_data is suitably described by:

```
BEGIN
  return ((second_datum−first_datum)/(intermediate_
    steps+1) x index)
END
```

Figure 3A:
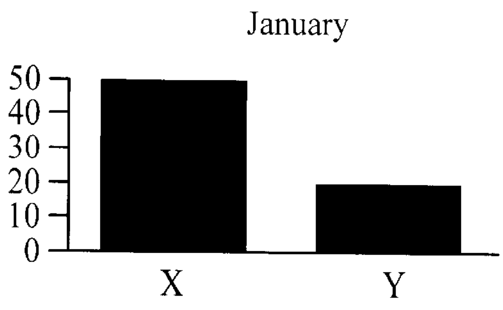
FIGS. 3*a*, 3*b*, 3*c*, 3*d*, and 3*e* illustrate an example of successive charts for dynamic transitioning between two static charts.
Figure 3B:
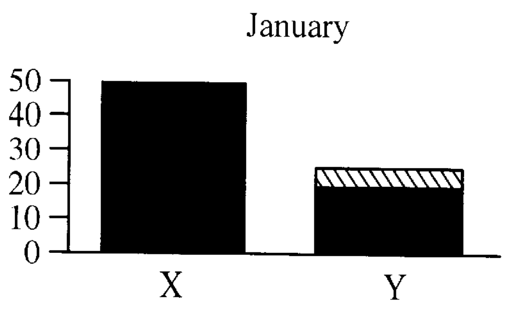
Figure 3C:
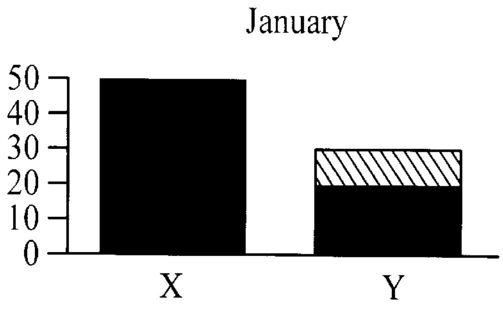
Figure 3D:
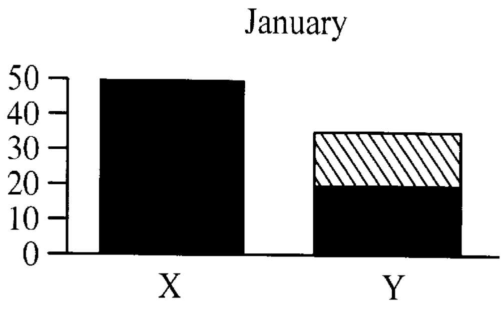
Figure 3E:
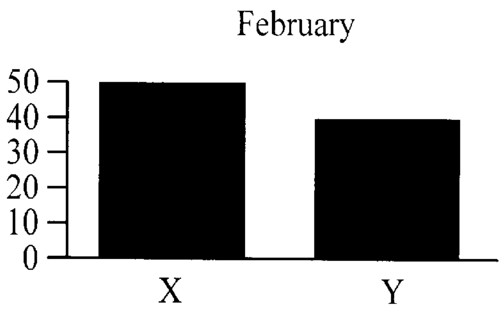

As an example with four intermediate steps between a beginning and ending static chart, FIG. 3*a* illustrates an initial static chart where two categories, 'X' and 'Y', are plotted, while FIG. 3*e* illustrates a final static chart for categories 'X' and 'Y'. In the example, the initial value for category 'Y' is 20 (FIG. 3*a*), and the final value for category 'Y' is 40 (FIG. 3*e*). Category 'X' remains unchanged. With a difference of twenty between the initial and final values of category 'Y' and a chosen number of four intermediate steps, a linear interpolation of the data results in a change of five units per intermediate step. Thus, FIG. 3*b* illustrates a change from twenty to twenty-five in category 'Y', FIG. 3*c* illustrates a change from twenty-five to thirty, FIG. 3*d* illustrates a changes from thirty to thirty-five, and FIG. 3*e* illustrates the final change from thirty-five to forty, with the change in value demonstrated by the dashed areas in the FIGS. 3*b*, 3*c*, and 3*d*. Of course, the dashing is meant to more distinctively represent the effect of the interpolated steps in the figures, but these dashed areas would not be displayed as such in an actual display. While it is difficult to fully represent the dynamic nature of a display from the initial static chart of FIG. 3*a* to the final static chart of FIG. 3*e* through sequential figures, when the charts of FIGS. 3*a*–3*e* are displayed, one overlaying the previous, an animated view is created in which the value of 'Y' grows from 20 to 40.

Thus, a relationship between static charts for all related information is more effectively presented. Dynamic charts display the information on one view by progressively overlaying older views with newer ones. Data can be interpolated between actual points by any numerical method preferred.

Controlling the display of these charts gives control over how the charts are viewed. The control of the displayed charts is analogous to play, stop, fast forward, and reverse controls provided by video cassette recorders (VCRs) during the display of recorded images. In accordance with the present invention, control over the display of dynamic charts allows chart 'frames' to be viewed in standard display, fast forward or reverse display, and single frame step, either forward or reverse. Additional controls for controlling the dynamic chart display include pause and stop.

In order to provide the control, the present invention integrates indication of a delay factor and direction to the dynamic display of chart data. The preceding description referred to a specified interval between charts, e.g., a normal delay time set in a configuration file or through a GUI (graphical user interface). By way of example, when there are thirty intermediate charts between two static charts, and the desired real time interval for their display is one second, the time interval between successive displays of the intermediate charts would be 1000 milliseconds for 30 frames, or 33.3 milliseconds per frame. The normal delay value is thus 33.3 milliseconds, since the specified interval sets what is normally used as a delay value.

Changing the specified interval or normal delay to something greater, e.g., 3 to 5 times greater, would make the display of charts less frequent, thus giving the impression of a slow play or slow frame step. Conversely, changing the interval to something smaller, e.g., ⅓ to ⅕ times smaller, would make the display of charts more frequent, thus giving the impression of a fast play or fast frame step. Setting the interval to an infinite delay would give the impression of stopping the display and completely freezing on the currently displayed chart.

In order to provide for the specification of a direction and speed during the dynamic display of charts, the previously presented pseudocode is altered. The basic display of dynamic charts presented with reference to FIG. 2 had the intermediate chart value increase for every iteration and a set specified interval delay between intermediate charts. To account for direction, the intermediate chart value increases for the forward direction and decreases for reverse direction with an assumption that direction is '1' for forward and '−1' for reverse. To account for delay changes, the specified interval is modified appropriately. The following pseudocode represents the addition of delay and direction control to the dynamic display of charts.

```
FOR count=beginning_chart TO ending_chart STEP direction
  generate n intermediate_charts between chart[count] and
    chart[count+1]
  display static chart[count]
  FOR index=first_step TO last_step STEP direction
    SWITCH (control_event)
      CASE stop
        delay=infinite
      CASE play_forward
        delay=normal
        direction=forward
      CASE play_reverse
        delay=normal
        direction=reverse
      CASE fast_forward
        delay=smaller
        direction=forward
      CASE fast_reverse
        delay=smaller
        direction=reverse
      CASE slow_forward
        delay=larger
        direction=forward
      CASE slow_reverse
        delay=larger
        direction=reverse
    END
    display intermediate_chart[index]
  END
END
wait delay
display static chart[number_charts]
```

The indication of the control events for stop, play forward, play reverse, fast forward, fast reverse, slow forward, and slow reverse is generated by a suitable interactive means, such as clicking on icons on a GUI or selecting appropriate keyboard keys, during the dynamic display (i.e., step 210, FIG. 2). The selected control event is passed to the control logic that implements the above pseudocode. In single-threaded environments, the control events are polled or queried prior to processing the specified delay interval. In multi-threaded environments, the control event code is able to set the delay value at any given time and used in every iteration through the control logic when the delay value is needed. In either case, if a stop control event has been processed, the next control event triggers the continuation of the display by terminating the delay and setting the delay to one of the aforementioned values.

Figure 4:
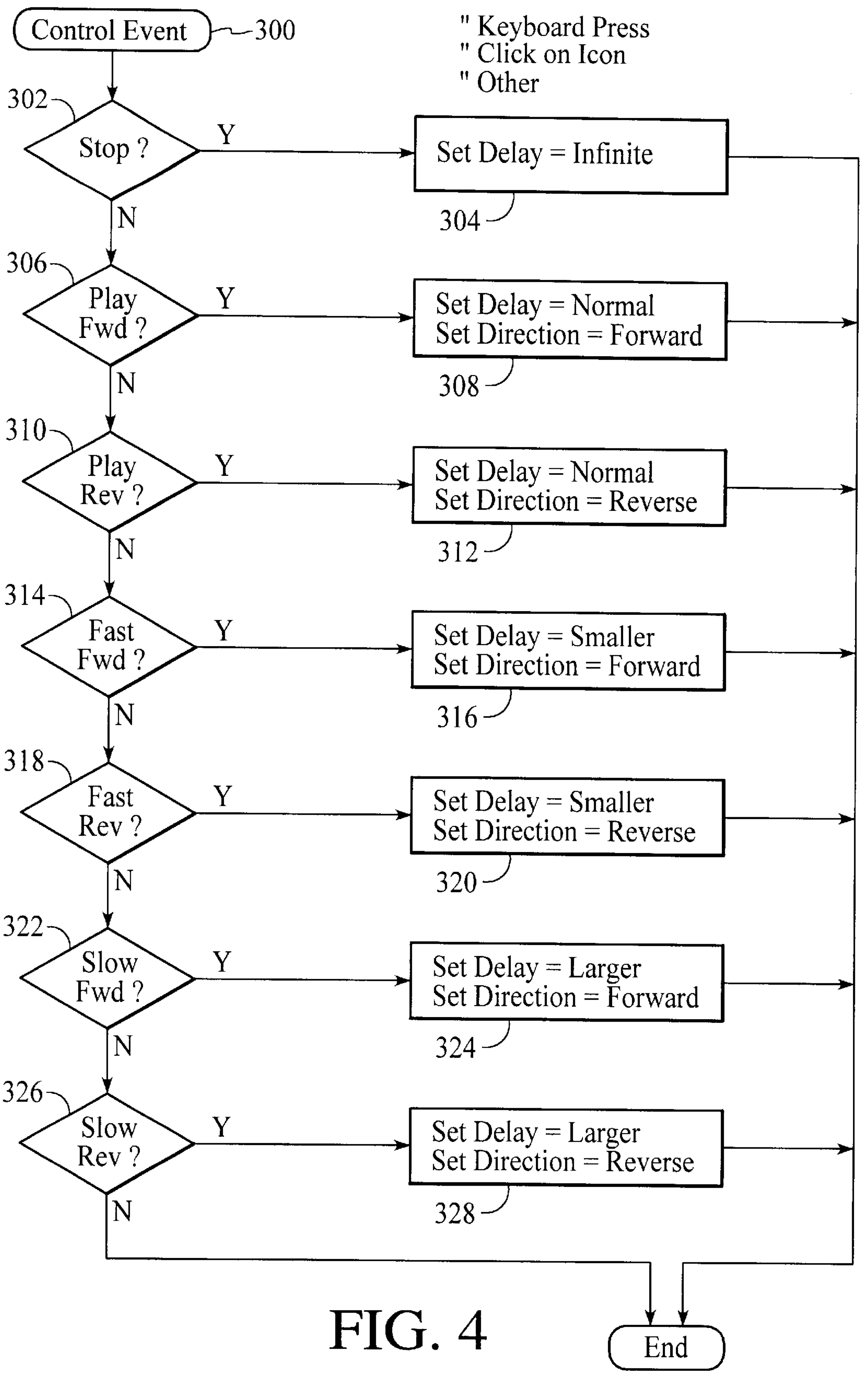
FIG. 4 illustrates a block diagram for processing control events to control the dynamic display of data in accordance with the present invention.

FIG. 4 illustrates a flow diagram representing the effect of the occurrence of a control event during the dynamic chart display. Upon the occurrence of a control event (step 300), e.g., by a key selection on a keyboard or icon selection on a GUI, the type of control event is determined. For a stop event (step 302), the delay value is set to infinite (step 304). For a play forward event (step 306), the delay is set to normal, and the direction is set to forward (step 308). For a play reverse event (step 310), the delay is set to normal, and the direction is set to reverse (step 312). For a fast forward event (step 314), the delay is set to a smaller delay value (e.g., ⅓ to ⅕ smaller than normal), and the direction is set to forward (step 316). For a fast reverse event (step 318), the delay is set to the smaller value, and the direction is set to reverse (step 320). For a slow forward event (step 322), the delay is set to a larger delay value (e.g., 3 to 5 times larger than normal), and the direction is set to forward (step 324). For a slow reverse event (step 326), the delay is set to the larger value, and the direction is set to reverse (step 328). It should be appreciated that although the events have been presented in a particular order in FIG. 4, this is meant as illustrative and not restrictive of an order for determining which control event has occurred.

Thus, in the present invention, the ability to control dynamic displays of static chart data is achieved. Through this control, greater convenience results as users are able to adjust the dynamic display as desired. Further, analysis of trends is improved by allowing more distinct viewing of multiple chart data in the single dynamic display.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing control of the display of dynamically displayed charts, the method comprising:

obtaining data from first and second static charts;

displaying data from the first static chart as a beginning chart;

adjusting the displayed data from the first static chart to visually indicate a change in the data required by the data from the second static chart as an ending chart in a direction and with a delay based on a selected display control event, including determining a number of steps desired between the first and second static charts, selecting an interpolation algorithm to process changes in data between the first and second static charts, generating intermediate charts from the obtained data wherein the number of steps desired determines a number of intermediate charts generated, and displaying the intermediate charts through overlaying of one intermediate chart over another in the direction and with a preset delay interval to visually indicate the change in data between the intermediate charts.

2.The method of claim 1 wherein adjusting further comprises adjusting in a forward direction and with the preset delay interval for a play forward control event.

3. The method of claim 1 wherein adjusting further comprises adjusting in a reverse direction and with the preset delay interval for a play reverse control event.

4. The method of claim 1 wherein adjusting further comprises adjusting in a forward direction and with a delay interval shorter than the preset delay interval for a fast forward control event.

5. The method of claim 1 wherein adjusting further comprises adjusting in a reverse direction and with a delay interval shorter than the preset delay interval for a fast reverse control event.

6. The method of claim 1 wherein adjusting further comprises adjusting in a forward direction and with a delay interval longer than the preset delay interval for a slow forward control event.

7. The method of claim 1 wherein adjusting further comprises adjusting in a reverse direction and with a delay interval longer than the preset delay interval for a slow reverse control event.

8. The method of claim 1 wherein adjusting further comprises adjusting with an infinite delay interval for a stop control event.

9. A system for controlling a dynamic display of static chart data, the system comprising:

memory storage for storing data from at least two static charts;

a display for displaying the stored data; and a processor coupled to the display and to the memory storage for supporting a process of obtaining data from first and second static charts stored in the memory, displaying the data from the first static chart as a beginning chart on the display, and adjusting the displayed data from the first static chart to visually indicate a change in the data required by the data from the second static chart to display an ending chart on the display in a direction and with a delay based on a selected display control event, including determining a number of steps desired between the first and second static charts, selecting an interpolation algorithm to process changes in data between the first and second static charts, generating intermediate charts from the obtained data wherein the number of steps desired determines a number of intermediate charts generated, and displaying the intermediate charts through overlaying of one intermediate chart over another in the direction and with a preset delay interval to visually indicate the change in data between the intermediate charts.

10. The system of claim 9 wherein adjusting further comprises adjusting in a forward direction and with the preset delay interval for a play forward control event and adjusting in a reverse direction and with the preset delay interval for a play reverse control event.

11. The system of claim 9 wherein adjusting further comprises adjusting in a forward direction and with a delay interval shorter than the preset delay interval for a fast forward control event and adjusting in a reverse direction and with a delay interval shorter than the preset delay interval for a fast reverse control event.

12. The system of claim 9 wherein adjusting further comprises adjusting in a forward direction and with a delay interval longer than the preset delay interval for a slow forward control event and adjusting in a reverse direction and with a delay interval longer than the preset delay interval for a slow reverse control event.

13. The system of claim 9 wherein adjusting further comprises adjusting with an infinite delay interval for a stop control event.

14. A method for controlling a dynamic display of data between two static charts, the method comprising:

determining a number of intermediate charts between first and second static charts;

retrieving data for the first static chart;

retrieving data for the second static chart;

generating the number of intermediate charts;

displaying the first static chart; and overlaying the display with each generated intermediate chart in a direction and with a delay based on a selected control event to control the dynamic display of the data from the first static chart to the second static chart.

15. The method of claim 14 wherein the selected control event further comprises one of the group consisting of a play forward control event, a play reverse control event, a fast forward control event, a fast reverse control event, a slow forward control event, a slow reverse control event, and a stop control event.

16. The method of claim 15 further comprising overlaying in a forward direction for a play forward control event and overlaying in a reverse direction for a play reverse control event.

17. The method of claim 15 further comprising overlaying with a smaller than normal delay for a fast control event, with a larger than normal delay for a slow control event, and with an infinite delay for a stop control event.

18. The method of claim 15 further comprising selecting a displayed indicator associated with a control event to provide the selected control event.

19. The method of claim 1 wherein the first, second, and intermediate charts have similar data in a consistent display.

20. The system of claim 9 wherein the first, second, and intermediate charts have similar data in a consistent display.

21. The method of claim 14 wherein the first, second, and intermediate charts have similar data in a consistent display.

* * * * *